(12) United States Patent
Obikane et al.

(10) Patent No.: US 6,185,229 B1
(45) Date of Patent: Feb. 6, 2001

(54) DATA MULTIPLEXING APPARATUS AND METHOD THEREOF

(75) Inventors: Nobuhisa Obikane; Toshihiko Kitazawa; Toshiaki Setogawa; Satoshi Miyazawa, all of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 08/954,881

(22) Filed: Oct. 7, 1997

Related U.S. Application Data (63) Continuation of application No. PCT/IB97/00543, filed on Mar. 18, 1997.

(30) Foreign Application Priority Data

Mar. 19, 1996 (JP) .................................................. 8-062474

(51) Int. Cl.[7] .................................................. H04L 12/54
(52) U.S. Cl. .................................................. 370/537; 348/423
(58) Field of Search .................................................. 348/423, 468, 348/563; 370/537, 538, 540, 465, 470, 473, 474, 468, 490, 493, 522; 386/98

(56) References Cited

U.S. PATENT DOCUMENTS

| 4,864,562 | * | 9/1989 | Murakami et al. ................ 370/538 |
| 5,050,161 | * | 9/1991 | Golestani ........................ 370/391 |
| 5,381,412 | * | 1/1995 | Otani ............................... 370/537 |
| 5,446,738 |   | 8/1995 | Kim et al. . |
| 5,481,543 | * | 1/1996 | Veltman .......................... 370/473 |
| 5,541,919 | * | 7/1996 | Yong et al. . |
| 5,684,542 | * | 11/1997 | Tsukagoshi ...................... 348/468 |
| 5,742,732 | * | 4/1998 | Kubo et al. ........................ 386/95 |
| 5,802,068 | * | 9/1998 | Kuda ................................. 370/538 |
| 5,894,328 | * | 4/1999 | Tahara et al. .................... 348/423 |
| 6,009,108 | * | 12/1999 | Takehara et al. ................. 370/538 |

FOREIGN PATENT DOCUMENTS

| 0 322 026 | 6/1989 | (EP) . |
| 0 425 834 | 5/1991 | (EP) . |
| 0 515 101 | 11/1992 | (EP) . |
| 0 596 732 | 5/1994 | (EP) . |
| 0 618 695 | 10/1994 | (EP) . |

OTHER PUBLICATIONS

Fernseh und Kinotechnik, vol. 48, No. 10, published Oct. 1, 1994, Heidelberg, DE.

* cited by examiner

*Primary Examiner*—Douglas W. Olms
*Assistant Examiner*—Kenneth Vanderpuye
(74) *Attorney, Agent, or Firm*—Frommer Lawrence & Haug, LLP.; William S. Frommer; Dexter T. Chang (57) ABSTRACT

A data multiplexer and a method thereof for multiplexing audio data, video data and additional data for digital television broadcasting. Size information for such data may be obtained and supplied by way of a CPU bus to a CPU which utilizes such size information in controlling a multiplexing operation. The audio, video and additional data may be multiplexed under the control of the CPU without being supplied to the CPU. As a result, high speed multiplexing may be performed.

10 Claims, 5 Drawing Sheets

DATA MULTIPLEXING APPARATUS AND METHOD THEREOF

This is a continuation of copending International Application PCT/IB97/00543 having an international filing data of Mar. 18, 1997.

BACKGROUND OF THE INVENTION

The present invention relates to an apparatus and a method for multiplexing video data, audio data and additional data such as subtitles and generating a transport stream for transmission, wherein the video data and audio data may be compressed and encoded according to a MPEG standard or the like.

In digital television broadcasting systems, audio data and video data may be processed for particular applications such as movies or music promotions. More specifically, in such digital television broadcasting systems, data may be processed into data suitable for a so-called surround system, audio data may be processed so as to presented in several languages, or audio data, video data and additional data may be multiplexed so as to generate a transport stream wherein a dialogue may be superimposed in a number of languages, and broadcasted to viewers.

OBJECTS AND SUMMARY OF THE INVENTION

An object of the present invention is to provide a data multiplexer and a method thereof for enabling audio data, video data and additional data to be multiplexed in a digital television broadcasting system or the like.

Another object of the present invention is to provide a data multiplexer and a method as aforesaid wherein the data may be multiplexed at a relatively high speed and wherein changes in the type of the additional data and in processing may be readily accommodated.

According to an aspect of the present invention, a data multiplexing apparatus is provided which comprises a data size detecting device for detecting data sizes of input video data and audio data, a buffer device for buffering the input video data and audio data, a device for formulating a multiplexing plan for the input video data and audio data in response to the detected data sizes and for controlling the multiplexing of the video data and audio data in response to the multiplexing plan so as to obtain a multiplexed data stream, a bus for connecting the data size detecting means and the controlling device, a data supply line for supplying the input video data and audio data to the buffer device, and a data output line for outputting the multiplexed data stream to an external apparatus. The bus is separate from the data supply line means and the data output line means so that the video data and audio data do not pass through the bus.

Preferably, the controlling device may include a computer, the bus may include a computer bus connected to the computer. Further, the present data multiplexer may also include an encoding device(s) for encoding the video data, the audio data and first additional data and for supplying the encoded data to the data size detecting device and the buffer device. Furthermore, the present data multiplexer may also include a data receiving device for receiving second additional data from outside for supply to a data selecting device.

The present data multiplexer may multiplex video data, audio data and first additional data such as subtitles for use in a digital television broadcasting system and may further multiplex second additional data (private data) such as superimposed dialogue into multiplexed data so as to generate a transport data stream. In such data multiplexer; a multiplexing system for directly multiplexing video data and other data (such as audio data and so forth) and a control system, separate from the multiplexing system, for controlling the multiplexing may be provided and arranged such that the video and other data to be multiplexed and data associated with multiplexing control may be respectively processed in the corresponding system.

In the present data multiplexer, the data size determining or counting device may be arranged within the control system and may count video data, audio data and first additional data after such data has been compressed and encoded according to a MPEG standard or the like so as to obtain data size information thereof. The buffer device may be arranged within the multiplexing system and may include FIFO (first in first out) memories or the like for buffering the video data, the audio data, and the first additional data. First and second data multiplexing portions may be included within the multiplexing system, wherein the first data multiplexing portion may select and multiplex the buffered video data, audio data, and/or first additional data, and the second data multiplexing portion may select any of the video data, the audio data and the first additional data which are selected and multiplexed by the first data multiplexing portion or may select the second additional data such as superimposed dialogue data under the control of the control system and may multiplex any of the video data, the audio data and the first additional data which are multiplexed and the second additional data. The controlling device may be arranged within the control system and may formulate a plan for multiplexing the video data, the audio data, the first additional data and the second additional data, timing adjustment, scheduling or the like based on the data size of the video data, the audio data and the additional data as determined or counted by the data size counting device. The controlling device may also control the selection by the first and second data multiplexing portions based on the multiplexing plan so as to control the multiplexing of the data in the first and second data multiplexing portions.

According to another aspect of the present invention, a data multiplexing method is provided which comprises the steps of receiving video data, audio data, first additional data, and second additional data; obtaining data sizes of the received video data, audio data and first additional data; buffering the received video data, audio data and first additional data; selecting the buffered video data, audio data or first additional data; selecting the received second additional data or the selected one of the buffered video data, audio data, and first additional data; formulating a plan for multiplexing the video data, the audio data, the first additional data, and the second additional data based on the data size of the video data, the audio data and the additional data; and controlling the selection of the buffered video data, audio data or first additional data and the selection of the second additional data or the selected one of the buffered video data, audio data, and first additional data based on the multiplexing plan so as to multiplex the video data, the audio data, the first additional data, and the second additional data.

Other objects, features and advantages according to the present invention will become apparent from the following detailed description of illustrated embodiments when read in connection with the accompanying drawings in which corresponding components are identified by the same reference numerals.

DESCRIPTION OF THE PREFERRED EMBODIMENTS

Figure 1:
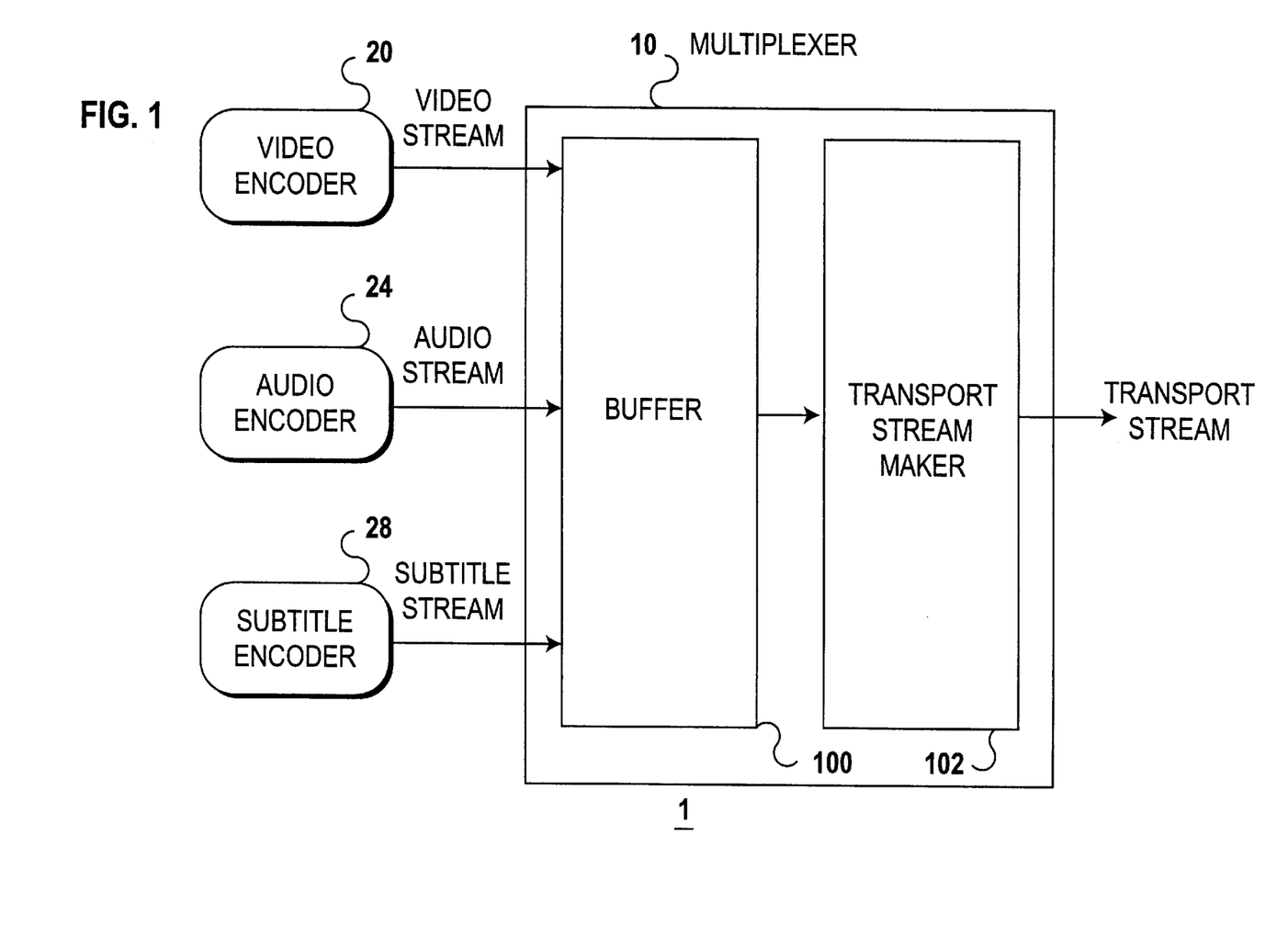
FIG. 1 is a diagram of a data multiplexer according to an embodiment of the present invention.

FIG. 1 illustrates a data multiplexer 1. As shown therein, such data multiplexer may include a video encoder 20, an audio encoder 24, a subtitle encoder 28, and a multiplexer 10 having a buffer memory 100 and a transport stream maker 102. The data multiplexer 1 may receive and encode a video stream, an audio stream, and a subtitle stream (for movie or music promotion) and may multiplex the same into one stream so as to generate a transport stream, as hereinbelow more fully described.

More specifically, the video encoder 20 may receive video data from an external device (not shown) such as an editing device and so forth and may compress and encode the received video data according to a predetermined standard (such as an MPEG2 standard or the like) and output the obtained data as a video stream to the buffer memory 100. The audio encoder 24 may receive audio data from an external device (not shown) and may compress and encode the received audio data according to a predetermined standard (such as an MPEG2 standard or the like) and output the obtained data as an audio stream to the buffer memory 100. The subtitle encoder 28 may receive subtitle data from an external generating subtitle data device (not shown) and may encode the received subtitle data by a predetermined process (such as a linear quantization process and a fixed-length encoding process) and output the obtained result as a subtitle stream to the buffer memory 100.

The buffer memory 100 buffers the video stream, the audio stream and the subtitle stream respectively supplied from the video encoder 20, the audio encoder 24 and the subtitle encoder 28, and supplies an output to the transport stream maker 102. The transport stream maker 102, which may include a high-speed computer having a microprocessor (CPU) or the like, may obtain or read out the video stream, the audio stream, and the subtitle stream (each of which may be referred to as an elementary stream) from the buffer memory 100, may perform scheduling, and may add a header or the like in accordance with a transmission format so as to generate a transport stream for output therefrom.

In the data multiplexer 1, the buffer memory 100 temporarily stores all the elementary streams therein and the CPU of the transport stream maker 102 performs processing such as scheduling and addition of a header to generate a transport stream. However, in performing such processing, the CPU may access each word (byte) in the elementary streams through a data bus in such a manner that a so-called bus neck or the like may be generated in the data bus of the transport stream maker 102 which may hinder or prevent high-speed processing. Accordingly, such processing manner may not be acceptable for forming a transport stream.

A data multiplexer 2 will now be described with reference to FIGS. 2–5 which may overcome the above-described problems of the data multiplexer 1. In such multiplexer 2, by separating a control system for performing scheduling for multiplexing the elementary streams from a multiplexing system for directly multiplexing the elementary streams, high-speed production of a transport stream may be obtained, as hereinbelow more fully described.

Figure 2:
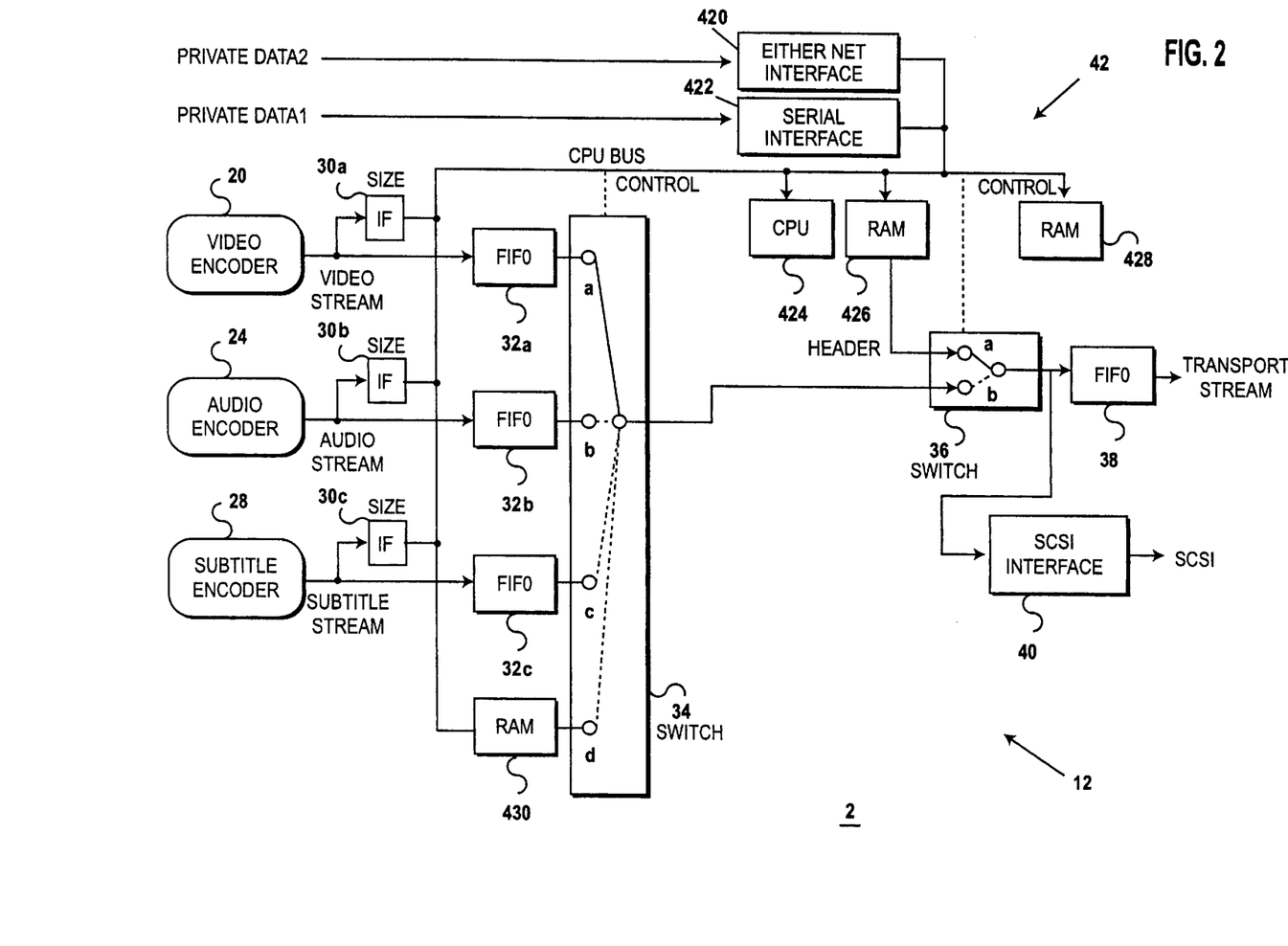
FIG. 2 is a diagram of the data multiplexer according to an embodiment of the present invention.

As shown in FIG. 2, the data multiplexer 2 generally includes the video encoder 20, the audio encoder 24, the subtitle encoder 28, a multiplexing system 12, and a control system 42. The multiplexing system 12 may include FIFO memories 32a, 32b, and 32c, a RAM 430, a first switch circuit 34, a second switch circuit 36, a FIFO memory 38, and a SCSI (small computer system interface) circuit 40, which may be connected as shown in FIG. 2. The control system 42 may include data size counting interface circuits 30a, 30b, and 30c, an ethernet interface (ENIF) circuit 420, a serial interface (SIF) circuit 422, a CPU 424, a processing RAM 426, and a control data RAM 428, which may be coupled together through a CPU bus as shown in FIG. 2.

Figure 3:
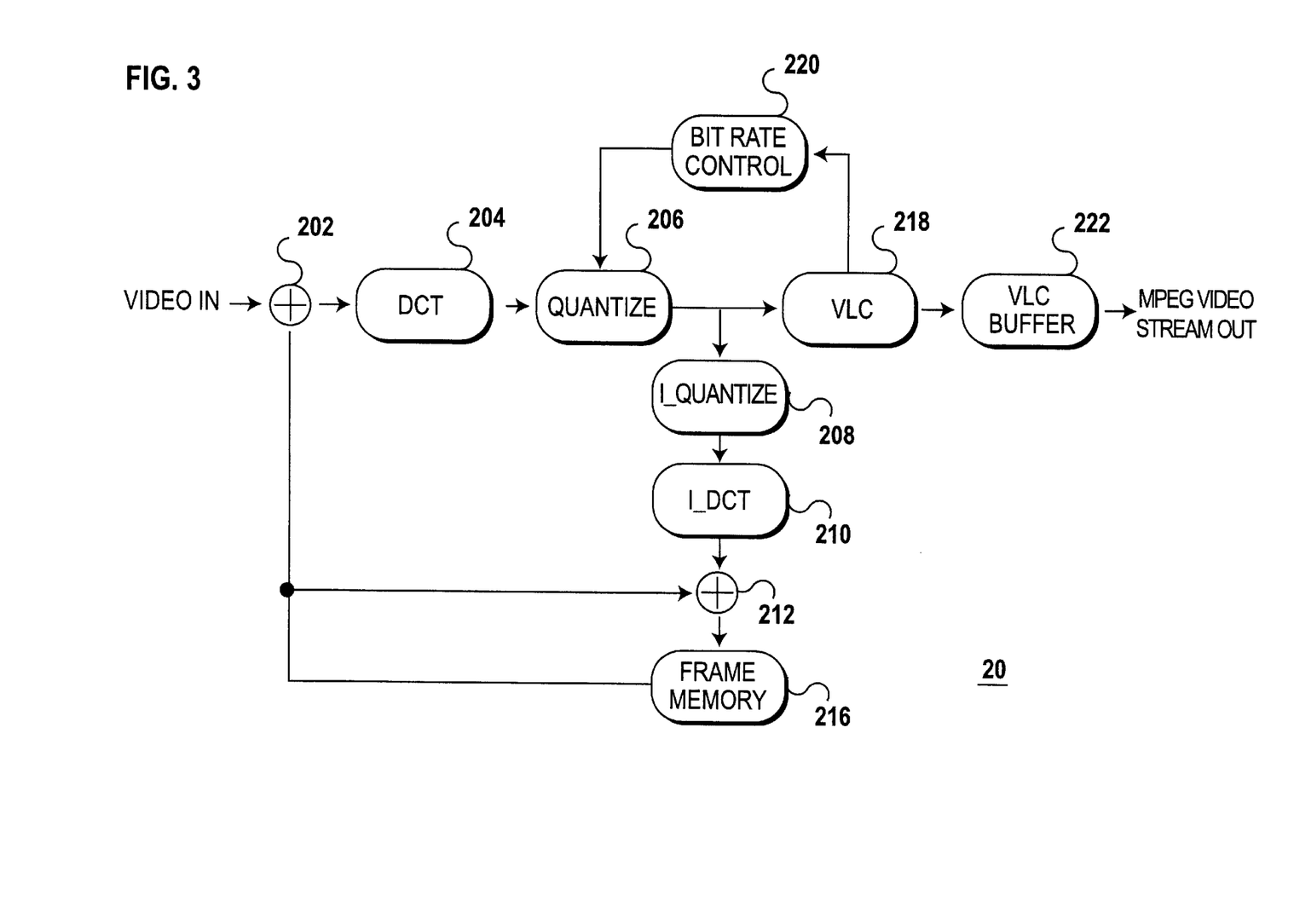
FIG. 3 is a diagram of a video encoder in the data multiplexer of FIG. 2.

The video encoder 20 may include adding circuits 202 and 212, a discrete cosine transform (DCT) circuit 204, a quantizing circuit 206, an inverse quantizing circuit 208, an inverse DCT circuit 210, a frame memory circuit 216, a variable-length encoding (VLC) circuit 218, a bit rate control circuit 220, and a variable-length encoding (VLC) buffer 222, which may be arranged as shown in FIG. 3. The video encoder 20 is adapted to receive an input video data (Video IN) from an external device and to compress and encode the same according to a predetermined standard, such as a MPEG2 standard or the like, and to generate a video stream (MPEG Video stream) for supply to the data size IF 30a and the FIFO memory 32a (FIG. 2). A further description of such video encoder may be obtained from U.S. application Ser. No. 08/806,211, now U.S. Pat. No. 5,822,024 filed on Feb. 26, 1997 entitled "Image Data Processing Method and Apparatus of Same", which is hereby incorporated by reference.

Figure 4:
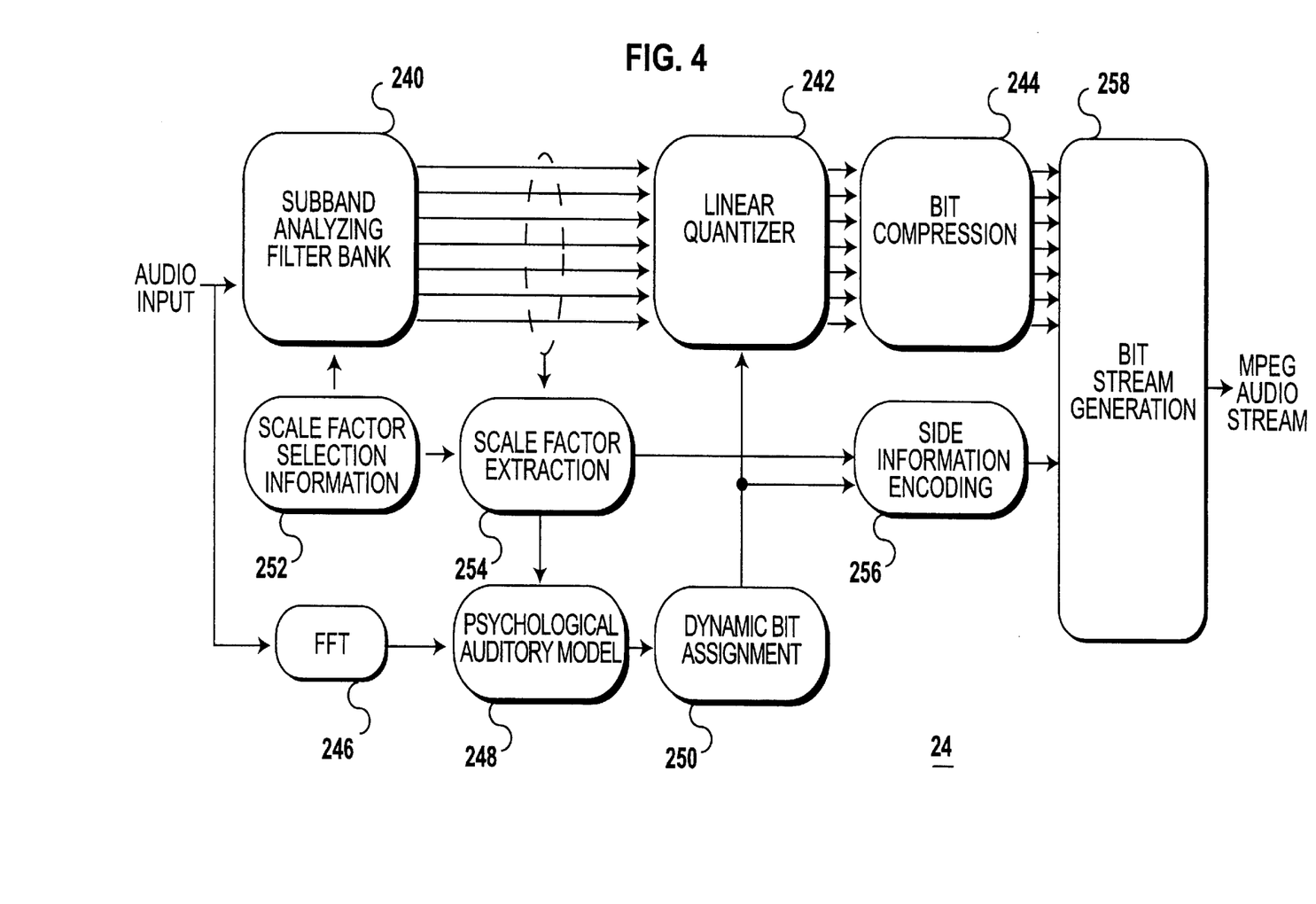
FIG. 4 is a diagram of an audio encoder in the data multiplexer of FIG. 2.

The audio encoder 24 may include a sub-band analyzing filter bank (SAFB) 240, a linear quantizing circuit 242, a bit compression circuit 244, a fast fourier transfer (FFT) circuit 246, a psychological auditory model 248, a dynamic bit assignment circuit 250, a scale factor selection information storing circuit 252, a scale factor extracting circuit 254, a side information encoding circuit 256, and a bit stream generating circuit 258, as shown in FIG. 4. The audio encoder 24 is adapted to receive audio data (Audio Input) from an external device and to compress and encode the same according to a predetermined standard, such as a MPEG2 standard or the like, and to generate an audio stream (MPEG Audio stream) for supply to the data size IF 30b and the FIFO memory 32b (FIG. 2). A further description of such audio encoder may be obtained from an article entitled "ISO-MPEG-1 Audio: A Generic Standard for Coding of High-Quality Digital Audio", by K. Brandenburg et al., J. Audio Eng. Soc., Vol. 42, No. 10, October 1994, pages 780–792, which is hereby incorporated by reference.

The subtitle encoder 28 is adapted to receive additional data such as subtitle data from an external device and to encode the same, in a manner similar to that previously described, and to generate a subtitle stream for supply to the data size IF 30c and the FIFO memory 32c (FIG. 2).

Further, encoded data (such as subtitle data, closed-caption data, and so forth) may be supplied from an external device. For example, encoded subtitle data may be supplied through a LAN (local area network) such as the Ethernet to the ENIF circuit 420 or encoded subtitle data may be supplied through a serial line to the serial interface 422, and such received encoded subtitle data may be supplied through the CPU bus to the RAM 430 for storage therein. Since the amount of encoded subtitle data is relatively small, as compared to the amount of encoded video data and/or encoded audio data, supplying the encoded subtitle data on the CPU bus may not adversely affect the CPU bus traffic. In this situation, the ENIF circuit 420 or the serial interface 422 may detect information such as the header and/or size information (which may be written in the header) in the encoded subtitle data, and the detected information may be supplied through the CPU bus to the CPU 424.

In the multiplexing system 12 (FIG. 2), the FIFO memories 32*a*, 32*b* and 32*c* respectively buffer the video stream, the audio stream and the subtitle stream received from the video encoder 20, the audio encoder 24 and the subtitle encoder 28 and supply output streams to input terminals a, b and c of the switch circuit 34. Additionally, the encoded subtitle data stored in the RAM 430 may be supplied to an input terminal d of the switching circuit 34 under the control of the CPU 424. In accordance with a control signal which may be supplied from the CPU 24, the switch circuit 34 selects any of the input terminals a, b, c and d and supplies the respective elementary stream supplied to the selected input terminal to an input terminal b of the switch circuit 36. As a result, a multiplexed signal or stream may be formed and supplied to the input terminal b of the switch circuit 36. The switch circuit 34 may select none of the input terminals a, b, c and d and, as such, output a predetermined amount of blank data (for example, consecutive logic values of 1 or 0) when no elementary stream is supplied to any of the input terminals or when a so-called stuffing process is being performed.

The RAM 26 may supply a signal or additional data stream, which may be representative of a header, to an input terminal a of the switch circuit 36. In accordance with a control signal which may be supplied by the CPU 424, the switch circuit 36 may select any of the input terminals a and b so as to multiplex the elementary streams supplied from the switch circuit 34 to the input terminal b of the switch circuit 36 and the additional data stream (header information) supplied from the processing RAM 426 to the input terminal a of the switch circuit 36. A multiplexed or selected data stream is supplied from the switch circuit 36 to the FIFO memory 38 and the SCSIIF circuit 40.

The FIFO memory 38 buffers the multiplexed data stream received from the switch circuit 36 and supplies an output or a transport stream to an external device (not shown) such as a communication line and so forth. The SCSIIF circuit 40 receives the multiplexed data stream from the switch circuit 36 and supplies the same to a storage device (not shown) such as a hard disk drive (HDD) or a magnetic optical disk drive (MOD) wherein the data stream is stored.

In the control system 42, the data size IFs 30*a*, 30*b*, and 30*c* may count the data size for each frame of the video stream, the audio stream, and the subtitle stream respectively supplied from the video encoder 20, the audio encoder 24, and the subtitle encoder 28 and may supply the obtained result to the CPU 42 by way of the CPU bus. Such counting of data sizes may be achieved by use of counters which may be included in the data size IFs 30*a*, 30*b*, and 30*c*. Alternatively, data size information may be determined by the respective encoder and supplied as an output signal therefrom, whereupon such data size information signal may be detected and supplied to the CPU 424.

The ENIF circuit 420 may receive private data through a LAN (not shown) such as Ethernet and may output data to the CPU 424 through the CPU bus. The SIF circuit 422 may receive private data having a serial format from, for example, a computer or the like, and may output data to the CPU 424. Such so-called private data may include encoded subtitle data, closed caption data, user data, and so forth.

The CPU 424 may include a microprocessor and a ROM for storing programs. Such CPU is adapted to receive and store the data sizes from the data size IFs 30*a*, 30*b* and 30*c*, and data from the ENIF circuit 420 and the SIF circuit 422. The CPU is further adapted to formulate a multiplexing plan or to control the multiplexing operation of the present data multiplexer. That is, the CPU 424 may control the multiplexing of the elementary streams, timing adjustment and scheduling for multiplexing based on the data sizes stored in the processing RAM 426, and the switching or multiplexing operation of the switch circuits 34.and 36 according to the multiplexing plan by way of the CPU bus.

Control data for processing the CPU 424 may be stored in the control data RAM 428. Additionally, the CPU may control or utilize the processing RAM 426 for processing, storing, and/or supplying data. For example, the CPU 424 may use the processing RAM 426 to generate header information, store such header information, and output the same to the input terminal a of the switch circuit 36 on the basis of a scheduling procedure or the like in accordance with control data stored in the control data RAM 428. Alternatively, the header information or a portion thereof may be generated on the basis of private data (such as user data) supplied from the ENIF circuit 420 or the SIF circuit 422 and stored in the RAM 426.

An operation of the data multiplexer 2 will now be described hereinbelow.

Video data, audio data, and subtitle data are respectively supplied to the video encoder 20, the audio encoder 24, and the subtitle encoder 28 and encoded thereat. The data size of the encoded video stream, audio stream and subtitle stream are determined by counting the data in the data size IFs 30*a*, 30*b* and 30*c* and the obtained counted data sizes are supplied to the CPU 424.

On the other hand, when encoded subtitle data is supplied through a LAN (such the Ether network) to the ENIF circuit 420, or when encoded subtitle data is supplied through a serial line to the serial interface 422, the ENIF circuit 420 or the serial interface 422 may detect the data size, whereupon the detected data size is supplied to the CPU 424 through the CPU bus. In this situation, the encoded sub-code data may be supplied to the RAM 430 and outputted therefrom to the input terminal d of the switching circuit 34 under the control of the CPU 424.

Data may be switched or multiplexed by use of switch circuits 34 and 36 in accordance with control signals from the CPU 424. An output from the switch circuit 36 is supplied to the FIFO 38 and the SCSIIF circuit 40. The FIFO 38 buffers the received data and outputs a transport stream which may be supplied over a communication line or the like. The SCSIIF circuit 40 transmits the received data to a hard disc drive or the like so as to record the same.

Figure 5:
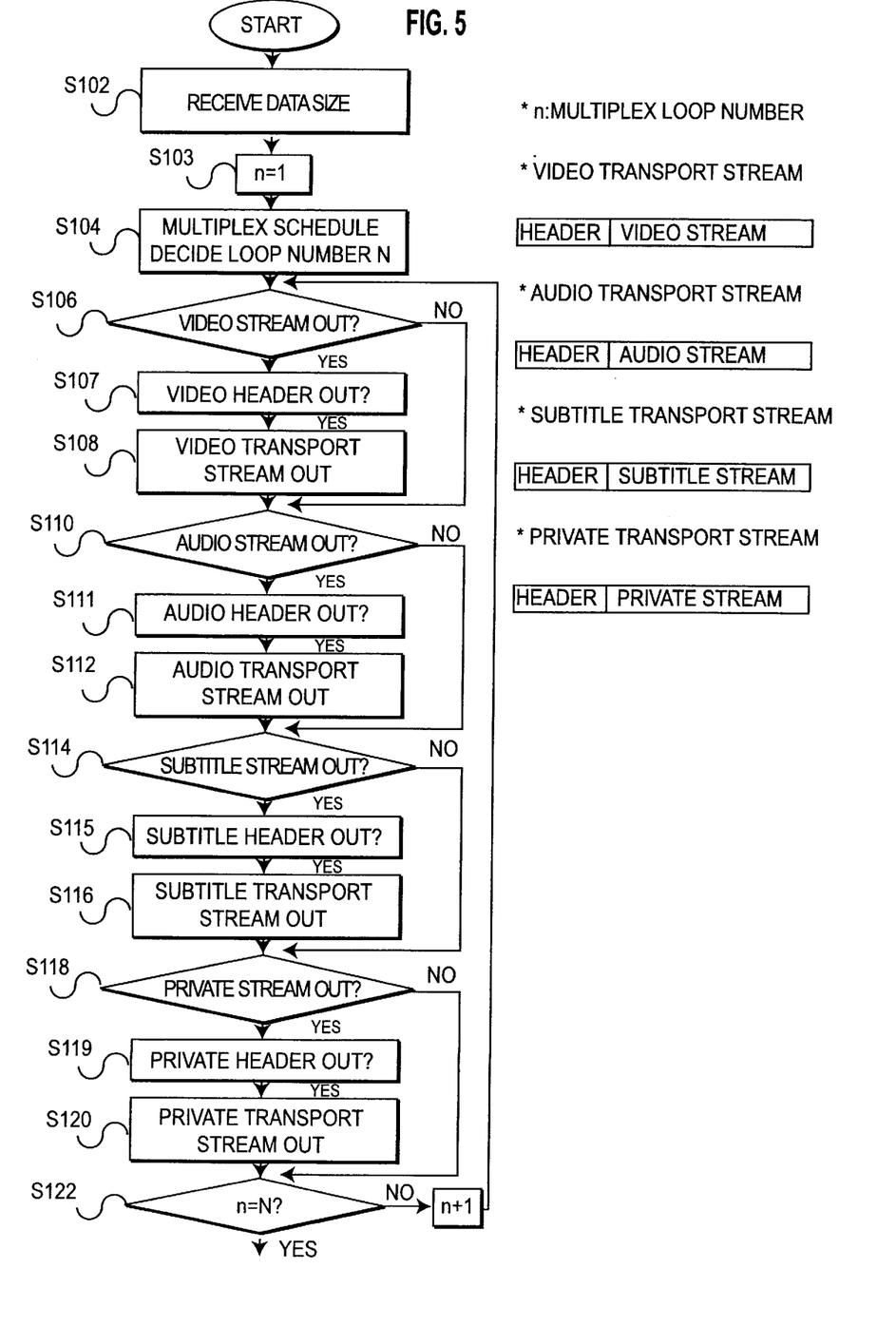
FIG. 5 is a flowchart to which reference will be made in explaining the processing performed by a CPU in the data multiplexer of FIG. 2.

The processing performing by the CPU 24 will now be further described with reference to the flowchart of FIG. 5.

At step S102, the CPU 424 receives the data sizes of a frame(s) for a video stream, an audio stream and a subtitle stream from the data size IF 30*a*, 30*b* and 30*c* and stores the received data sizes in the processing RAM 426. The CPU 424 may receive data sizes from the ENIF circuit 420 and the SIF circuit 422, whereupon the CPU 424 stores such data sizes. Processing then proceeds to step S103 wherein the parameters may be initialized by the CPU 424. Processing then proceeds to step S104.

In step S104, the CPU 424 formulates a multiplexing plan. That is, a loop iteration number N is determined. Such loop iteration number N may indicate the number of packets which may be inserted into one video frame or a duration thereof, in which the size of a packet may have a fixed predetermined value such as 188 bytes. Accordingly, the loop iteration number N may be determined on the basis of the data rate of the transport stream. For example, the loop iteration number N may be defined as the data rate (bytes) of the transport steam/30 frames per second (when a NTSC system is utilized)/188 (bytes). The scheduling of the multiplexing is determined on the basis of the loop iteration number N and the received respective data sizes.

Processing then proceeds to step S106, wherein a determination is made by the CPU 424 as to whether the multiplexing plan indicates that a video stream is to be outputted. If such determination is affirmative, processing proceeds to step S107. At step S107, the CPU 424 controls the switch circuit 36 such that header information is selected from input terminal a which, in turn, may be supplied from the RAM 426. Thereafter, processing proceeds to step S108, wherein the CPU 424 controls the switch circuit 34 to select the video stream (which may be obtained from terminal a of switch circuit 34) and controls the switch circuit 36 to select the data stream from the switch circuit 34 (which may be obtained from terminal b of switch circuit 36) so that the video stream is multiplexed to the transport stream. Processing then proceeds to step Silo.

If, on the other hand, the determination in step S106 is negative, processing proceeds to step Silo.

In step S110, a determination is made by the CPU 424 as to whether the multiplexing plan indicates that an audio stream is to be outputted. If such determination is affirmative, processing proceeds to step S111. At step S111, the CPU 424 controls the switch circuit 36 such that header information is selected from input terminal a which, in turn, may be supplied from the RAM 426. Thereafter, processing proceeds to step S112, wherein the CPU 424 controls the switch circuit 34 to select the audio stream (which may be obtained from terminal b of switch circuit 34) and controls the switch circuit 36 to select the data stream from the switch circuit 34 (which may be obtained from terminal b of switch circuit 36) so that the audio stream is multiplexed to the transport stream.

If, on the other hand, the determination in step S110 is negative, processing proceeds to step S114.

In step S114, a determination is made by the CPU 424 as to whether the multiplexing plan (procedure) indicates that a subtitle stream is to be outputted from the subtitle encoder. If such determination is affirmative, processing proceeds to step 115. At step S115, the CPU 424 controls the switch circuit 36 such that header information is selected from input terminal a which, in turn, may be supplied from the RAM 426. Thereafter, processing proceeds to step S116, wherein the CPU 424 controls the switch circuit 34 to select the subtitle stream (which may be obtained from terminal c of switch circuit 34) and controls the switch circuit 36 to select the data stream from the switch circuit 34 (which may be obtained from terminal b of switch circuit 36) so that the subtitle stream is multiplexed to the transport stream. Processing then proceeds to step S118.

If, on the other hand, the determination in step S114 is negative, processing proceeds to step S118.

In step S118, a determination is made by the CPU 424 as to whether the multiplexing plan indicates that an additional or private data stream (header information) is to be outputted. If such determination is affirmative, processing proceeds to step S119. At step S118, the CPU 424 controls the switch circuit 36 to select the additional data stream in order to multiplex the additional data stream (header information) to the transport stream. Processing then proceeds to step S120, wherein the CPU 424 controls the switch circuit 34, the switch circuit 36 and the RAM 430 to output the private data from the RAM 430, resulting in the multiplexing of the same to the transport stream. Thereafter, processing then proceeds to step S122.

If, on the other hand, the determination in step S118 is negative, processing proceeds to step S122.

At step S122, a determination is made by the CPU 424 as to whether n=N. If such determination is affirmative, that is, if n=N, then the processing is terminated. However, if such determination is negative, that is, if nN, N is incremented by one and processing returns to step S106.

Therefore, in the data multiplexer 2, information indicative of the size of the video data, audio data and/or additional data may be supplied to the CPU by way of a CPU or data bus; whereas the video data, audio data and/or additional data or elementary stream(s) thereof which may have a relatively large amount of data may not transported to the CPU over the CPU bus. Instead, the video data, audio data and/or additional data may be supplied through a number of switch circuits so as to form a transport or multiplexed stream. As a result, the likelihood of a bottleneck or bus neck occurring on the CPU bus is greatly reduced so that high-speed multiplexing of the elementary stream to a transport stream may be achieved.

Further, the subtitle encoder 28 and the private data lines may both be utilized to supply information. For example, subtitle information may be supplied through the subtitle encoder 28 and closed captioned may be supplied through the private data lines. As another example, subtitle information may be supplied through the private data lines and other information may be supplied through the subtitle encoder 28. As is to be appreciated, either of the private data lines or the encoder 28 may be omitted depending upon the desired application or use.

Additionally, since a multiplexing plan is formulated by software processing performed by the CPU 424 each time the transport stream is produced, the present invention enables the type or number of additional data stream (header information) to be added to be readily changed as compared to the arrangement wherein an elementary stream is multiplexed to the transport stream using hardware.

Although the data multiplexer of FIG. 2 was described has having a certain number of each type of elements, the present data multiplexer is not so limited and may have other numbers of such elements. For example, none or more than one ENIF circuit 420 or SIF circuit 422 may be utilized. Further, any number of elementary streams may be multiplexed to obtain a transport stream.

Additionally, the data multiplexer 2 may be modified so as to obtain a transport stream which may be desired for a particular application. For example, the data multiplexer 2 may be modified so that a data stream associated with an editing process or a broadcasting process is multiplexed in place of the subtitle stream to obtain the transport stream.

Thus, as described above, the present data multiplexer may enable audio data, video data and additional data to be multiplexed in a digital television broadcasting system or the like at a relatively high speed and may enable changes in the kind of additional data and in processing to be readily incorporated.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A data multiplexing apparatus comprising:
   means for receiving audio data, video data, and additional data;
   obtaining means for obtaining size information for said audio data, said video data, and said additional data;
   means for receiving said size information from the obtaining means by way of a data bus and for generating a multiplexing schedule based on said size information;
   means for multiplexing said audio data, said video data, and said additional data so as to form a multiplexed data stream and for supplying the same therefrom; and
   control means for controlling said multiplexing means in response to said multiplexing schedule;
   said data bus being arranged such that said audio data and said video data are not supplied to said means for receiving said size information.

2. A data multiplexing apparatus according to claim 1, wherein said additional information includes subtitle data.

3. A data multiplexing apparatus according to claim 1, wherein said means for obtaining size information includes counters for counting said audio data, said video data and said additional data.

4. A data multiplexing method comprising the steps of:
   receiving audio data, video data, and additional data and obtaining size information for said audio data, said video data, and said additional data;
   supplying said size information by way of a data bus to schedule generating means which generates a multiplexing schedule based on said size information;
   multiplexing said audio data, said video data, and said additional data so as to form a multiplexed data stream; and
   controlling said multiplexing in response to said multiplexing schedule;
   said data bus being arranged such that said audio data and said video data are not supplied to said schedule generating means.

5. A data multiplexing method according to claim 4, wherein said additional information includes subtitle data.

6. A data multiplexing method according to claim 4, wherein said size information is obtained by counting said audio data, said video data and said additional data.

7. A data multiplexing apparatus comprising:
   data size detecting means for detecting data sizes of a video encoded stream and an audio encoded stream to generate size information;
   means for receiving said size information by way of a data line and for generating a multiplexing schedule based on said size information;
   multiplexing means for receiving said video encoded stream and said audio encoded stream by way of a signal line, and for multiplexing said video encoded stream and said audio encoded stream to generate a multiplexed stream;
   control means for controlling said multiplexing means in response to said multiplexing schedule;
   wherein said data line is separated from said signal line such that said control means does not receive said video encoded stream and said audio encoded stream.

8. A data multiplexing method comprising the steps of:
   detecting data sizes of a video encoded stream and an audio encoded stream to generate size information;
   receiving said size information by way of a data line and generating a multiplexing schedule based on said size information;
   receiving said video encoded stream and said audio encoded stream by way of a signal line and multiplexing said video encoded stream and said audio encoded stream to generate a multiplexed stream;
   controlling said multiplexing in response to said multiplexing schedule;
   wherein said data line is separated from said signal line.

9. A data multiplexing apparatus comprising:
   detecting means for detecting data sizes of a video encoded stream and an audio encoded stream to generate size information;
   means, connected to said detecting means to receive said size information, for generating a multiplexing schedule based on said size information without receiving said video encoded stream and said audio encoded stream;
   multiplexing means for receiving said video encoded stream and said audio encoded stream, and for multiplexing said video encoded stream and said audio encoded stream to generate a multiplexed stream; and
   means for controlling said multiplexing means in response to said multiplexing schedule.

10. A data multiplexing method comprising the steps of:
    detecting data sizes of a video encoded stream and an audio encoded stream to generate size information;
    receiving said size information and generating a multiplexing schedule based on said size information without receiving said video encoded stream and said audio encoded stream;
    receiving and multiplexing said video encoded stream and said audio encoded stream to generate a multiplexed stream; and
    controlling said multiplexing in response to said multiplexing schedule.

* * * * *